(12) United States Patent
Ivanchenko

(10) Patent No.: US 10,088,924 B1
(45) Date of Patent: Oct. 2, 2018

(54) OVERCOMING MOTION EFFECTS IN GESTURE RECOGNITION

(75) Inventor: Volodymyr V. Ivanchenko, Mountain View, CA (US)

(73) Assignee: Amazon Technologies, Inc., Reno, NV (US)

(*) Notice: Subject to any disclaimer, the term of this patent is extended or adjusted under 35 U.S.C. 154(b) by 583 days.

(21) Appl. No.: 13/198,008

(22) Filed: Aug. 4, 2011

(51) Int. Cl.
  *G06F 3/041* (2006.01)
  *G06F 3/048* (2013.01)

(52) U.S. Cl.
  CPC .............. *G06F 3/041* (2013.01); *G06F 3/048* (2013.01); *G06F 2203/04108* (2013.01)

(58) Field of Classification Search
  None
  See application file for complete search history.

(56) References Cited

U.S. PATENT DOCUMENTS

| | | |
|---|---|---|
| 4,836,670 A | 6/1989 | Hutchinson |
| 5,203,704 A * | 4/1993 | McCloud ............... G09B 19/00 434/112 |
| 5,563,988 A | 10/1996 | Maes et al. |
| 5,616,078 A | 4/1997 | Oh |
| 5,850,211 A | 12/1998 | Tognazzini |
| 5,999,091 A | 12/1999 | Wortham |
| 6,072,494 A * | 6/2000 | Nguyen ................... G06F 3/017 345/156 |
| 6,215,890 B1 * | 4/2001 | Matsuo et al. ................ 382/103 |
| 6,272,231 B1 | 8/2001 | Maurer et al. |
| 6,385,331 B2 | 5/2002 | Harakawa et al. |
| 6,429,810 B1 | 8/2002 | De Roche |
| 6,434,255 B1 | 8/2002 | Harakawa |
| 6,750,848 B1 | 6/2004 | Pryor |

(Continued)

FOREIGN PATENT DOCUMENTS

| | | |
|---|---|---|
| CN | 1694045 A | 11/2005 |
| GB | 2440348 | 1/2008 |

(Continued)

OTHER PUBLICATIONS

Ji et al., "Real time 3D face pose discrimination based on active IR illumination," Pattern Recognition, 2002. Proceedings. 16th International Conference on, vol. 4, pp. 310-313, Aug. 11-15, 2002.

(Continued)

*Primary Examiner* — Mihir K Rayan
(74) *Attorney, Agent, or Firm* — Polsinelli LLP

(57) ABSTRACT

A user can provide input to an electronic device by performing a specific motion or gesture that can be detected by the device. At least one imaging or detection element captures information including the motion or gesture, such that one or more dwell points can be determined in two or three dimensions of space. The dwell points can correspond to any point where the motion pauses for at least a minimum amount of time, such as at an endpoint or a point where the motion significantly changes or reverses direction. The set of dwell points, and the order in which those dwell points occur, can be compared against a set of gestures to attempt to match a gesture associated with a particular input. Such an approach is useful for devices with image capture elements or other components that are not able to accurately capture motion or determine movements, etc.

25 Claims, 6 Drawing Sheets

(56) References Cited

U.S. PATENT DOCUMENTS

| | | | |
|---|---|---|---|
| 6,863,609 B2 | 3/2005 | Okuda et al. | |
| 6,865,516 B1 | 3/2005 | Richardson | |
| 6,959,102 B2 | 10/2005 | Peck | |
| 7,095,401 B2 | 8/2006 | Liu et al. | |
| 7,199,767 B2 | 4/2007 | Spero | |
| 7,301,526 B2 | 11/2007 | Marvit et al. | |
| 7,379,566 B2 | 5/2008 | Hildreth | |
| 7,401,783 B2 | 7/2008 | Pryor | |
| 7,519,223 B2 | 4/2009 | Dehlin et al. | |
| 7,584,158 B2 | 9/2009 | Iwaki et al. | |
| 7,605,837 B2 | 10/2009 | Yuen et al. | |
| 7,675,539 B2 | 3/2010 | Matsui | |
| 8,063,938 B2 | 11/2011 | Ueki et al. | |
| 8,165,422 B2 * | 4/2012 | Wilson | G06F 3/0421 345/174 |
| 8,417,059 B2 | 4/2013 | Yamada | |
| 8,788,977 B2 | 7/2014 | Bezos | |
| 8,891,868 B1 * | 11/2014 | Ivanchenko | G06F 3/017 382/168 |
| 2001/0035087 A1 * | 11/2001 | Subotnick | G10H 1/0008 84/600 |
| 2002/0111819 A1 | 8/2002 | Li et al. | |
| 2002/0180799 A1 | 12/2002 | Peck et al. | |
| 2003/0004792 A1 | 1/2003 | Townzen et al. | |
| 2003/0028577 A1 | 2/2003 | Dorland et al. | |
| 2003/0069648 A1 | 4/2003 | Douglas et al. | |
| 2003/0132974 A1 * | 7/2003 | Bodin | G06F 3/017 715/863 |
| 2003/0142068 A1 | 7/2003 | DeLuca | |
| 2003/0174149 A1 * | 9/2003 | Fujisaki | G06F 3/0485 345/684 |
| 2003/0179073 A1 | 9/2003 | Ghazarian | |
| 2004/0001113 A1 * | 1/2004 | Zipperer | G06F 3/017 715/853 |
| 2004/0026529 A1 | 2/2004 | Float et al. | |
| 2004/0140956 A1 | 7/2004 | Kushler et al. | |
| 2005/0133693 A1 | 6/2005 | Fouquet et al. | |
| 2005/0162381 A1 * | 7/2005 | Bell et al. | 345/156 |
| 2005/0216867 A1 * | 9/2005 | Marvit et al. | 715/863 |
| 2005/0248529 A1 | 11/2005 | Endoh | |
| 2005/0275638 A1 * | 12/2005 | Kolmykov-Zotov et al. | 345/179 |
| 2007/0071277 A1 | 3/2007 | Van Der Veen et al. | |
| 2007/0164989 A1 | 7/2007 | Rochford et al. | |
| 2008/0005418 A1 | 1/2008 | Julian | |
| 2008/0013826 A1 | 1/2008 | Hillis et al. | |
| 2008/0019589 A1 | 1/2008 | Yoon | |
| 2008/0040692 A1 | 2/2008 | Sunday et al. | |
| 2008/0089587 A1 * | 4/2008 | Kim | G06F 3/017 382/190 |
| 2008/0122803 A1 | 5/2008 | Izadi et al. | |
| 2008/0136916 A1 | 6/2008 | Wolff | |
| 2008/0158096 A1 | 7/2008 | Breed | |
| 2008/0174570 A1 | 7/2008 | Jobs et al. | |
| 2008/0181499 A1 | 7/2008 | Yang et al. | |
| 2008/0266257 A1 | 10/2008 | Chiang | |
| 2008/0266530 A1 | 10/2008 | Takahashi et al. | |
| 2008/0276196 A1 | 11/2008 | Tang | |
| 2009/0031240 A1 | 1/2009 | Hildreth | |
| 2009/0079813 A1 | 3/2009 | Hildreth | |
| 2009/0102788 A1 | 4/2009 | Nishida et al. | |
| 2009/0103780 A1 * | 4/2009 | Nishihara et al. | 382/103 |
| 2009/0153288 A1 * | 6/2009 | Hope et al. | 340/3.1 |
| 2009/0154807 A1 | 6/2009 | Rossato et al. | |
| 2009/0196460 A1 | 8/2009 | Jakobs et al. | |
| 2009/0210789 A1 | 8/2009 | Thakkar et al. | |
| 2009/0217210 A1 * | 8/2009 | Zheng et al. | 715/863 |
| 2009/0265627 A1 | 10/2009 | Kim et al. | |
| 2009/0271004 A1 * | 10/2009 | Zecchin et al. | 700/13 |
| 2009/0313584 A1 | 12/2009 | Kerr | |
| 2010/0040292 A1 * | 2/2010 | Clarkson | G06K 9/00355 382/201 |
| 2010/0050133 A1 | 2/2010 | Nishihara et al. | |
| 2010/0066676 A1 | 3/2010 | Kramer et al. | |
| 2010/0097332 A1 | 4/2010 | Arthur et al. | |
| 2010/0104134 A1 | 4/2010 | Wang et al. | |
| 2010/0111416 A1 | 5/2010 | Meiers | |
| 2010/0125816 A1 | 5/2010 | Bezos | |
| 2010/0149115 A1 * | 6/2010 | Park | G06F 3/04883 345/173 |
| 2010/0169840 A1 | 7/2010 | Chen et al. | |
| 2010/0265316 A1 * | 10/2010 | Sali et al. | 348/46 |
| 2010/0306335 A1 | 12/2010 | Rios et al. | |
| 2011/0006978 A1 | 1/2011 | Yuan | |
| 2011/0102438 A1 * | 5/2011 | Mathe et al. | 345/426 |
| 2011/0109726 A1 | 5/2011 | Hwang et al. | |
| 2011/0128223 A1 | 6/2011 | Lashina et al. | |
| 2011/0262010 A1 | 10/2011 | Thorn | |
| 2011/0314427 A1 | 12/2011 | Sundararajan | |
| 2012/0005632 A1 | 1/2012 | Broyles et al. | |
| 2012/0027252 A1 | 2/2012 | Liu et al. | |
| 2012/0058565 A1 | 3/2012 | Berkelman et al. | |
| 2012/0124603 A1 | 5/2012 | Amada | |
| 2012/0147531 A1 | 6/2012 | Rabii | |
| 2012/0206333 A1 | 8/2012 | Kim | |
| 2012/0281129 A1 | 11/2012 | Wang et al. | |
| 2013/0004016 A1 * | 1/2013 | Karakotsios | G06K 9/00355 382/103 |
| 2013/0050425 A1 | 2/2013 | Im et al. | |
| 2013/0082978 A1 | 4/2013 | Horvitz et al. | |
| 2013/0155237 A1 | 6/2013 | Paek et al. | |
| 2013/0215017 A1 * | 8/2013 | Qin | G06F 3/017 345/156 |
| 2014/0285435 A1 | 9/2014 | Bezos | |
| 2015/0036884 A1 | 2/2015 | Ivanchenko | |

FOREIGN PATENT DOCUMENTS

| | | |
|---|---|---|
| JP | 2002-164990 | 6/2002 |
| JP | 2002-351603 | 12/2002 |
| JP | 2004-318826 | 11/2004 |
| JP | 2007-121489 | 5/2007 |
| JP | 2008-97220 | 4/2008 |
| JP | 2008-186247 | 8/2008 |
| WO | 02/015560 A3 | 2/2002 |
| WO | 06/036069 A1 | 4/2006 |

OTHER PUBLICATIONS

"First Office Action dated Mar. 22, 2013," Chinese Application No. 200980146841.0, 18 pages.

"Second Office Action dated Nov. 19, 2013," Chinese Application No. 200980146841.0, 9 pages.

"Notice of Allowance dated Mar. 4, 2014," U.S. Appl. No. 12/332,049, 8 pages.

"Non-Final Office Action dated Mar. 26, 2014," U.S. Appl. No. 13/198,125, 25 pages.

Nokia N95 8GB Data Sheet, Nokia, 2007, 1 page.

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 23, 2013", U.S. Appl. No. 12/786,297, 15 pages.

"Final Office Action dated Oct. 27, 2011", U.S. Appl. No. 12/332,049, 66 pages.

"Final Office Action dated Dec. 18, 2013", U.S. Appl. No. 13/198,125,.

"Final Office Action dated Jun. 3, 2013", U.S. Appl. No. 13/083,303, 17 pages.

"Final Office Action dated Jun. 6, 2013", U.S. Appl. No. 12/332,049, 70 pages.

"First Office Action dated Mar. 22, 2013", China Application 200980146841.0, 39 pages.

"International Preliminary Examination Report on Patentability dated Oct. 17, 2013", International Application PCT/US2012/032148, 5 pages.

"International Search Report dated Apr. 7, 2010", International Application PCT/US2009/065364, 2 pages.

"International Search Report dated Jul. 26, 2012", International Application PCT/US2012/032148, 7 pages.

(56) References Cited

OTHER PUBLICATIONS

"International Written Opinion dated Apr. 7, 2010", International Application PCT/US2009/065364, 7 pages.
"Introducing the Wii MotionPlus, Nintendo's Upcoming Accessory for the Revolutionary Wii Remote at Nintendo:: What's New", Nintendo Games, http://www.nintendo.com/whatsnew/detail/eMMuRj_N6vntHPDycCJAKWhE09zBvyPH, Jul. 14, 2008, 2 pages.
"Non Final Office Action dated Nov. 7, 2012", U.S. Appl. No. 12/332,049, 64 pages.
"Non Final Office Action dated Nov. 7, 2013", U.S. Appl. 13/246,561, 18 pages.
"Non Final Office Action dated Dec. 21, 2012", Korea Application 10-2011-7013875, 4 pages.
"Non Final Office Action dated Dec. 6, 2012", U.S. Appl. No. 13/083,303, 16 pages.
"Non Final Office Action dated Mar. 28, 2013", U.S. Appl. No. 12/786,297, 15 pages.
"Non Final Office Action dated Apr. 2, 2013", Japan Application 2011-537661, 2 pages.
"Non Final Office Action dated Jun. 10, 2011", U.S. Appl. No. 12/332,049, 48 pages.
"Non Final Office Action dated Jun. 5, 2013", U.S. Appl. No. 13/215,591.
"Non Final Office Action dated Jul. 26, 2013", U.S. Appl. No. 13/198,125, 16 pages.
"Notice of Allowance dated Nov. 8, 2013", U.S. Appl. No. 13/215,591.
"Notice of Allowance dated Aug. 14, 2013", U.S. Appl. No. 13/083,303, 6 pages.
"Office Action dated May 13, 2013", Canada Application 2,743,914, 2 pages.
"Preliminary Examination Report of Patentability dated Oct. 17, 2013", International Application PCT/US2012/032148.
Brashear, Helene et al., "Using Multiple Sensors for Mobile Sign Language Recognition", International Symposium on Wearable Computers, 2003, 8 pages.
Cornell, Jay , "Does This Headline Know You're Reading It?", h+Magazine, located at <http://hplusmagazine.com/articles/ai/does-headline-know-you%E2%80%099re-reading-it>, last accessed on Jun. 7, 2010, Mar. 19, 2010, 4 pages.
Haro, Antonio et al., "Mobile Camera-Based Adaptive Viewing", MUM '05 Proceedings of the 4th International Conference on Mobile and Ubiquitous Mulitmedia., 2005, 6 pages.
Padilla, Raymond , "Eye Toy (PS2)", <http://www.archive.gamespy.com/hardware/august03/eyetoyps2/index.shtml, Aug. 16, 2003, 2 pages.
Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.
Tyser, Peter , "Control an iPod with Gestures", http://www.videsignline.com/howto/170702555, Sep. 11, 2005, 4 pages.
Van Den Berg, Thomas T. , "Near Infrared Light Absorption in the Human Eye Media", Vision Res., vol. 37, No. 2, 1997, pp. 249-253.
Zyga, Lisa , "Hacking the Wii Remote for Physics Class", PHYSorg.com, http://www.physorg.com/news104502773.html, Jul. 24, 2007, 2 pages.
"Japanese Reexamination Report dated Aug. 28, 2014," Japanese Application No. 2011-537661, 5 pages.
"Non-Final Office Action dated Oct. 6, 2014," U.S. Appl. No. 14/298,577, 9 pages.
"Supplementary European Search Report dated Jul. 17, 2014," European Application No. 09828299.9, 13 pages.
"Supplementary European Search Report dated Aug. 5, 2014," European Application No. 09828299.9, 1 page.
"Third Office Action dated May 20, 2014," Chinese Application No. 200980146841.0, 8 pages.
"Examiner's Report dated Mar. 21, 2014," Canadian Application No. 2,743,914, 3 pages.
"Notice of Allowance dated Jul. 18, 2014," U.S. Appl. No. 13/198,125, 8 pages.
Fujita et al., "A Single-Motion-Vector/Cycle-Generation Optical Flow Processor Employing Directional-Edge Histogram Matching," ISCAS 2009, 4 pages.
Hayakawa et al., "Block-Matching-Based Motion Field Generation Utilizing Directional Edge Displacement," Computers and Electrical Engineering 36 (2010) 617-625, 4 pages.
Hao et al., "A VSL-Implementation-Friendly Ego-Motion Detection Algorithm Based on Edge-Histogram Matching," ICASSP 2006, 9 pages.
"Non-Final Office Action dated Nov. 25, 2014," U.S. Appl. No. 14/521,372, 7 pages.

* cited by examiner

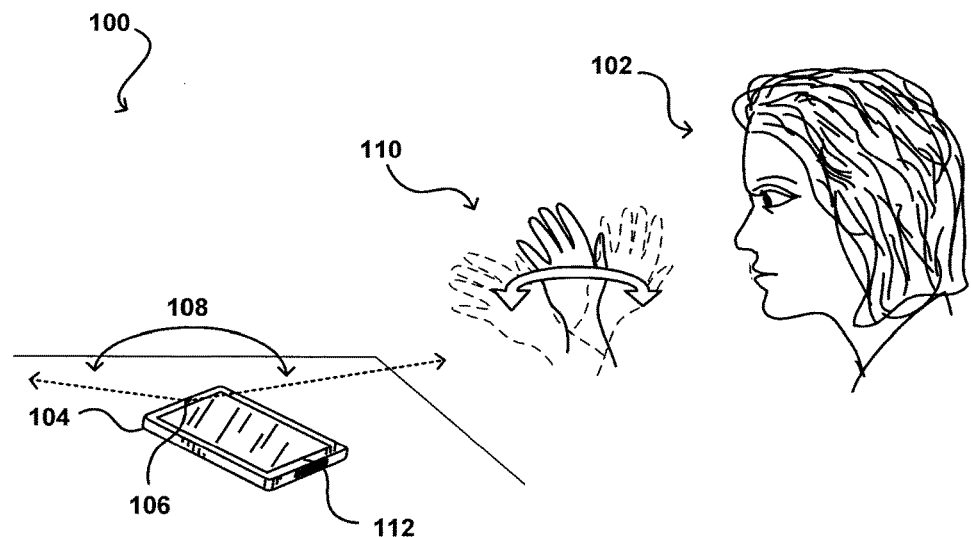
FIG. 1
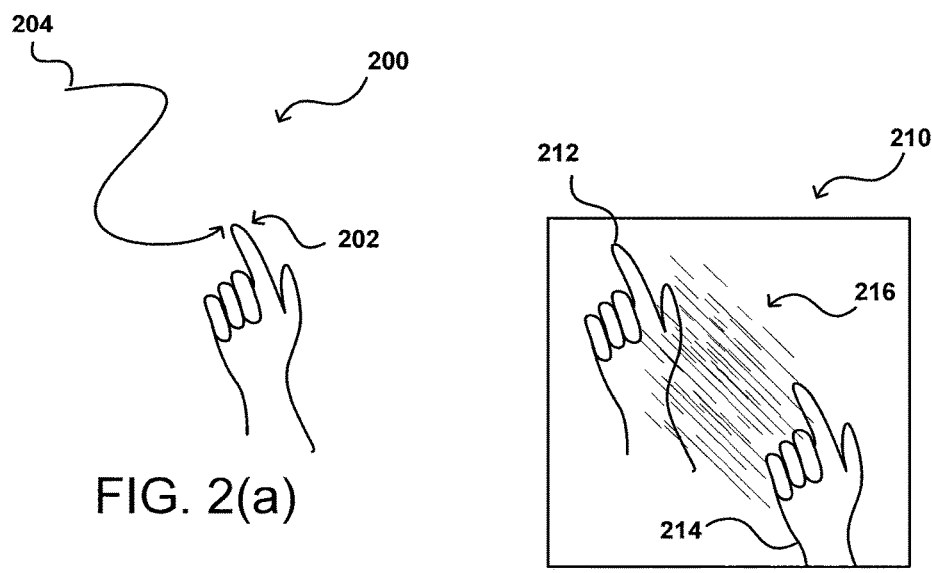
FIG. 2(a)
FIG. 2(b)

OVERCOMING MOTION EFFECTS IN GESTURE RECOGNITION

BACKGROUND

People are increasingly interacting with computers and other electronic devices in new and interesting ways. One such interaction approach involves making a detectable motion with respect to a device. While complex motion analysis devices are able to determine the motion with relative accuracy, such analysis is difficult to implement on consumer devices, particularly mobile or portable computing devices that generally have relatively simple camera elements. These camera elements often suffer from various limitations, such as a rolling shutter effect, that make it difficult to determine motion from still or video image information, as the motion appears as a blur in the captured image information. Even for higher quality imaging elements, motion blur can occur in certain environments or situations, such as indoors under low lighting conditions or when the user's hand is positioned too close to the camera. The limitations thus make it difficult, if not impossible, to determine the precise motion that was captured using one of these conventional devices.

BRIEF DESCRIPTION OF THE DRAWINGS

Various embodiments in accordance with the present disclosure will be described with reference to the drawings, in which:

FIG. 1 illustrates an example environment in which various aspects can be implemented in accordance with various embodiments;

FIGS. 2(a) and 2(b) illustrate an example motion that can be intended as input in accordance with various embodiments;

DETAILED DESCRIPTION

Figure 3A:
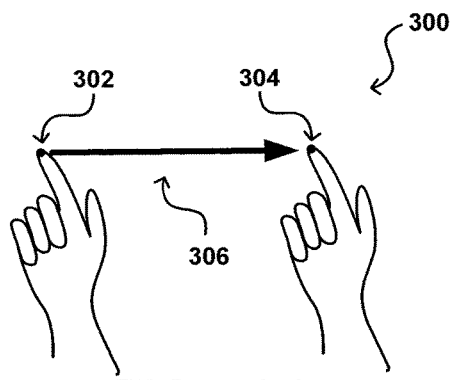
FIGS. 3(a), (b), (c), (d), (e), and (f) illustrate a examples motions that can be used to provide input to an electronic device in accordance with various embodiments.
Figure 3B:
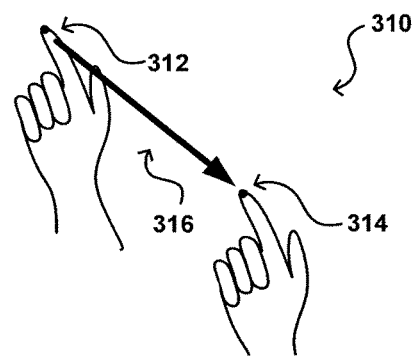

Systems and methods in accordance with various embodiments of the present disclosure may overcome one or more of the aforementioned and other deficiencies experienced in conventional approaches to providing input to an electronic device. In particular, various embodiments enable a user to provide motion- or gesture-based input to an electronic device without need to physically contact the device. The motion can be captured by at least one imaging element of the computing device, for example, and analyzed by the computing device (or a system, device, or service in communication with the computing device) to attempt to identify the motion or gesture. The captured image information can include at least a portion of the user, and can be analyzed to attempt to determine position information for one or more features of the user over a period of time. The position information can be compared to position information stored for a set of gestures for use in identifying that gesture.

In various embodiments, captured image information can be analyzed to determine the location of at least one feature, such as a user's fingertip, in the image information. Various positions of that feature over time then can be determined in two- or three-dimensional space. Because many types of electronic device might include imaging elements that are not capable of accurately capturing motion, approaches herein take advantage of any portion of a motion where a feature of the user being used to make a motion or gesture is substantially at rest, or at least moving relatively slowly, for at least a minimum period of time. These portions are referred to herein as "dwell points," which can include, for example, an endpoint, a transition point, a point of reversal, or other such portion wherein the feature is relatively stationary long enough for a conventional camera element (or other such component) to capture the approximate location of the feature. Each gesture can include two or more dwell points, which can be used to determine the input intended by the user.

In some embodiments, an application or interface on a computing device can utilize a pre-selected set of possible gestures, where each gesture has a sufficiently different set of dwell points. In at least some embodiments, the user can cause certain inputs to be matched to these pre-selected gestures. In some embodiments, a user can also have the ability to add additional gestures to a set of possible gestures. For each additional gesture, an application executing on the device can analyze the new gesture to determine a number of dwell points, and determine whether the relative location of those dwell points is sufficiently different to accurately distinguish that gesture from another gesture. For example, a user might perform a gesture that has a unique path, but similar dwell points. For example, an "S" shape and a straight line each have two endpoints and no other dwell points (considering a conventional "S" shape with no sharp transitions). A "Z" shape, on the other hand, has two endpoints and two other dwell points, where the motion has a distinct change in direction and the feature forming the Z would rest for at least a fraction of a second at each point where the motion changes direction. A "Z" gesture thus can be sufficiently differentiated from a gesture with only two dwell points, even if the shape of the "Z" formed is not particularly precise.

In at least some embodiments, a user can utilize motions or gestures that utilize more than one point of reference. For example, a user might make a gesture with two or more fingers, with the position of each of those fingers being tracked over time and having dwell points compared to stored gesture information. Similarly, a user might use two hands, eyes, elbows, held object, or any of a number of other features that can be tracked and analyzed for purposes of gesture input. The usage of multiple points of reference can increase the number of dwell points, and thus the number of distinguishable gestures.

Various lighting and capture approaches can be used in accordance with various embodiments. For example, ambient light or infrared imaging can be used to determine the location of various features relative to the device. In some embodiments, a combination of ambient and infrared imaging can be used to remove background objects from the captured image information in order to simplify, and improve the accuracy of, image processing. The information can be captured using any appropriate sensor or detector, such as a digital camera or infrared detector. Further, two or more imaging elements can be used together in at least some embodiments to provide position information in three dimensions.

Various other applications, processes and uses are presented below with respect to the various embodiments.

FIG. 1 illustrates an example situation 100 wherein a user 102 would like to provide gesture- and/or motion-based input to a computing device 104, such as to provide scroll through information in a Web browser, flip to the next page in an electronic book ("e-book"), or perform another such action. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another appropriate image capturing technology.

In this example, the user 102 is performing a selected motion or gesture using the user's hand 110. The motion can be one of a set of motions or gestures recognized by the device to correspond to a particular input or action, or can be a specific motion or gesture associated with that particular user. If the motion is performed within a viewable area or angular range 108 of at least one of the imaging elements 106 on the device, the device can capture image information including at least a portion of the motion or gesture, analyze the image information using at least one image analysis, feature recognition, or other such algorithm, and determine movement of at least one feature of the user between subsequent frames or portions of the image information. This can be performed using any process known or used for determining motion, such as locating "unique" features in one or more initial images and then tracking the locations of those features in subsequent images, whereby the movement of those features can be compared against a set of movements corresponding to the set of motions or gestures, etc. In some embodiments, a display screen 112 of the computing device can be a capacitive display allowing for non-contact input by a user when a feature of the user (e.g., a fingertip) is within a detectable range (e.g., 3-5 cm.) of the display. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference.

FIG. 2(a) illustrates an example situation 200 wherein a user is performing a gesture to be interpreted as input by an electronic device. In this example, a finger 202 of the user is being used to trace a path 204 corresponding to an "S" shape. As discussed, the user can perform this motion within the capture range of at least one image capture element of the electronic device. In this example, however, the image capture element is not able to accurately capture motion information. For example, FIG. 2(b) illustrates an example of captured image information 210 over time, showing the initial location 212 of the user's finger at the beginning of the motion, and the final location 214 of the user's finger at the end of the motion. FIG. 2(b) also illustrates, in a diagrammatic fashion, an example of a type of problem encountered by many conventional image capture elements. For example, a camera might exhibit a "rolling shutter" wherein different pixels of the camera sensor are read at different times (i.e., sequentially), such that the location of a feature at one point in the image can be significantly different than the location of that feature at another point in the image, as the information for those points were captured at different times. Thus, there can be a significant amount of blur 216 or distortion that can prevent a determination of the precise, or even approximate, location of the feature in the captured image information. If the motion is fast enough, the motion can almost appear transparent in the image information for at least some camera elements. In other situations, the color of the feature might blend with the background and/or feature edge information will not be easily obtained, which can make motion detection in sequential pairs of frames very difficult. In this example captured image information 210, the only information that can be determined with any level of accuracy is the location of each endpoint, or locations where the user started 212 and stopped 214 the gesture, as the feature was stationary for at least a fraction of a second, which for an imaging element with a sufficiently fast capture rate (e.g., at least 10-20 Hz) can be sufficient to locate the position of the feature in the image information.

Approaches in accordance with various embodiments can take advantage of the appearance of such dwell points in the captured image information to recognize specific gestures or motions made by a user. For example, an algorithm might not be able to determine the shape of the motion made in FIG. 2(a), but the algorithm can determine that the first dwell point was to the upper left (in the illustrated image information) and the second dwell point was to the lower right. If there are no other gestures with two dwell points arranged in such a way relative to each other, the algorithm can still recognize the gesture even thought the majority of the actual motion cannot be determined.

FIGS. 3(a) through 3(f) illustrate possible gestures that can be recognized as unique input in accordance with various embodiments. For example, FIG. 3(a) illustrates a simple gesture 300 with two dwell points, a starting endpoint 302 and a final endpoint 304, with a relatively simple path 306 there between. As with the example of FIG. 2(b), the path of motion does not matter as much as the relative location of the endpoints 302, 304. For example, in this motion the endpoints are relatively evenly positioned vertically, with the difference primarily being displacement horizontally in a particular direction. Such an input could be used to move to another home screen, flip to the next page, etc. A similar motion could be performed in the opposite direction, where the relative position of the endpoints would be approximately the same but the endpoints would be captured in a different order, and thus distinguishable as different input.

As mentioned, the relative positions of the dwell points for a gesture have to be different enough that the gesture can be distinguished from another gesture. For example, the motion 310 of FIG. 3(b) still has a path 316 with a starting endpoint 312 to the left of the final endpoint 314. In this case, however, there is a corresponding vertical displacement that distinguishes the motion from that of FIG. 3(a). The amount of necessary difference can vary between embodiments. For example, in some embodiments the difference between the position of at least one dwell point in a gesture must be a minimum percentage or threshold different from that of another gesture, such as at least 10% of the overall gesture footprint. In other examples there can be a minimum angular difference, such as at least 20 degrees, or another such value. Thus, a straight line might be used in a primarily right, left, up, or down direction, and may also be able to be used in a up-left, up-right, down-left, and down-right direction in various embodiments. Additional angles or directions might be used as well if the camera and device are sufficiently accurate, and if the user can repeat a motion with a 25 degree angle, for example, as opposed to a 45 degree angle. Various other approaches to differentiating two sets of points can be used as well as would be apparent to one of ordinary skill in the art in light of the present disclosure.

Further, in at least some embodiments the motions can be performed in three dimensions, adding depth information as well. For example, a straight motion could be an in-out or out-in motion in at least some embodiments, where the starting and final endpoints appear in substantially the same place in the captured image information (assuming 2D image capture, for example), but will be captured at different distances. If there is more than one camera, stereoscopic imaging or other such approaches can be used to determine the distance of each point from the device. If there is a single camera used for gesture determination, information such as the relative width of a feature (e.g., the user's finger or arm) in the image information can be indicative of distance. For simple gestures it may not matter how far in or out the motion goes, but the direction and relative positions between dwell points for purposes of gesture recognition and differentiation.

Figure 3C:
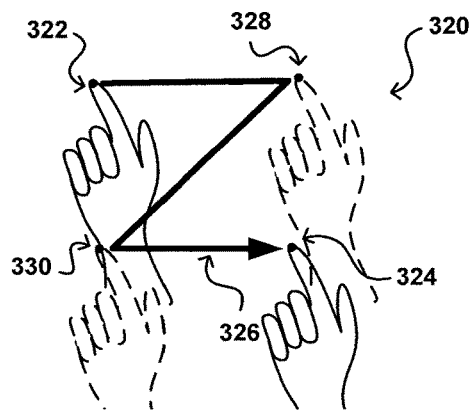

For additional gestures, it can be desirable in at least some embodiments to add one or more dwell points in various locations to help distinguish from other gestures. For example, a user might select to wake up a device by making a Z-like gesture 320 such as is illustrated in FIG. 3(c). As can be seen, the gesture has two endpoints 322, 324 arranged in an orientation similar to that of FIG. 3(b), but here there are additional dwell points along the path 326 that can be detected in the captured image information. In making the Z-gesture 328, the user will pause at dwell point 328 then dwell point 330 before moving on to endpoint 324. The exact location of each point is not critical, as long as the relative orientation can be determined and is sufficiently distinguishable from that of other gestures. As discussed, the ordering is important as well. For example, the same points could be used to form an "N" gesture if dwell point 330 was reached before dwell point 328. In some embodiments, a timestamp can be supplied with each image illustrating a dwell point for use in subsequent gesture matching. In some cases, differences in the time taken to make certain portions of a gesture can also help with gesture match, as a longer time between points can (potentially) be indicative of a longer path to get between those two points, which might indicate that another gesture was intended, etc. For example, a user intending a "Z" gesture might make more of an "S" type movement that results in one of the dwell points not being detected. If the algorithm can determine that the time between two points is longer than for the closest matching gesture, the device might not reach a consensus as to the appropriate gesture, whereby the user might be prompted to perform the gesture again or perform another such action.

Figure 3D:
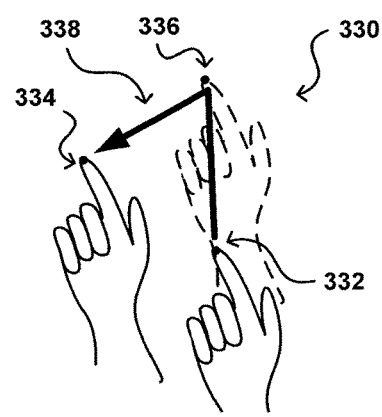
Figure 3E:
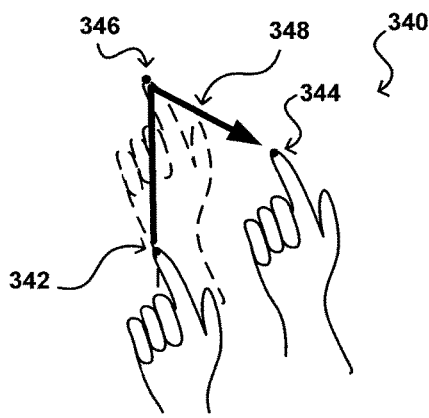
Figure 3F:
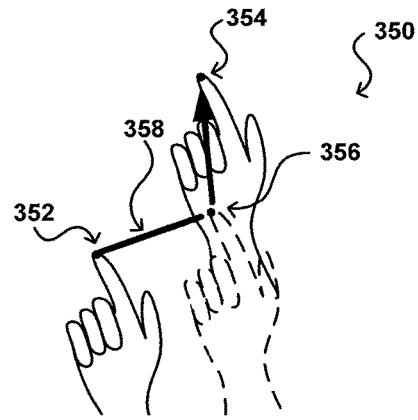

Various other gestures can be used as well in accordance with the various embodiments. For example, FIG. 3(d) illustrates an example gesture 330 that includes two endpoints 332, 334 and an intermediate dwell point 338. Such a path of motion 338 can be performed by a user to input a command corresponding to a certain action, such as to flip to the next page in an e-book interface. FIG. 3(e) illustrates a similar gesture 340 where the path 348 is effectively mirrored, with the path going up from the initial endpoint 342 to the intermediate dwell point 346, but then going in the opposite direction to the final endpoint 344. Such a gesture can be used to provide a related, but differing, input, such as to flip back to the previous page. In this case, an "upward" gesture might be associated with a particular application, such as an e-book reader interface, where variations of that motion correspond to different commands. Such an approach can make it easy for a user to learn and/or remember specific motions for an application, while providing simple but easily differentiable gestures as inputs to the device. As another example, FIG. 3(f) illustrates a gesture 350 where the vertical portion of the path 358 between dwell point 356 and endpoint 354 comes after the angled portion from the initial endpoint 352 to the dwell point 356, being similar to the motion in FIG. 3(d) but having a different ordering to provide a different input, such as to display a menu for the application, etc.

The possible motions or gestures can be performed using various objects or features in the various embodiments. For example, a user can form a "Z" gesture in different embodiments by using a finger without moving the user's hand, using a finger while bending the user's hand at the wrist, using a finger while moving the user's entire forearm, holding an object and moving a user's entire arm, etc. In some embodiments, these different motions might correspond to different gestures. For example, a fingertip might be monitored as a particular feature point. In some embodiments, a wrist position might also be monitored. A Z-type motion where the wrist does not move substantially (and thus has a single dwell point) might correspond to a first gesture, while a Z-type motion where the wrist moves to a second dwell point might correspond to a second gesture, even when a finger movement makes a Z-type gesture with four similar dwell points for each gesture. Similarly, a Z-type gesture might match a first input when the formation of the Z moves towards the device along the path, and a second input when the formation of the Z moves away from the device during the motion. Motions also can be combined, such as where a finger and thumb move together in a pinching motion. Here, each finger has only two dwell points but the relative positions of the dwell points for the two fingers can be indicative of an input. As discussed, features other than fingers, such as arms, eyes, head, feet, held objects, and various other objects or aspects, can be monitored as well for different algorithms. Various other motions are possible as well as should be apparent from the present disclosure.

In many instances, a gesture may be repeated a number of times to provide specific input. For example, a gesture indicating that the display of the device should scroll down may be repeated a number of times until the user locates the desired information. This cyclical nature of various gestures thus can also require that a boundary between such gestures can be determined. Otherwise, the repetition of a gesture might be determined to be a continuation of a single gesture having a large number of dwell points. In some embodiments, a user might have to wait a minimum amount of time between gestures, or at the end of a gesture, etc. In an up-scrolling gesture example, a finger might be motionless for at least 200 ms at the onset, then may move up, reverse direction after about 100 ms., and then return to the initial position. If the finger again stays motionless for at least 200 ms, the device can register this delay as a transition between gestures. It should be understood that the necessary delay between gestures can be any appropriate value as may be selected based upon factors such as shutter speed, frame rate, etc.

As discussed, a user can make an appropriate motion or gesture within a capture range of at least one image capture element of an electronic device. The information captured by the image capture element can be analyzed to determine a location of at least one specific feature in each frame or other segment of information, in order to track the position of each feature over time. The feature position can be determined, for example, through image analysis of a camera-captured image or intensity analysis of reflected IR radiation in a sensor-captured image. Various other imaging approaches can be used as well. The captured image information can be analyzed to determine a period over which a detected motion might correspond to a gesture or other such input. In many embodiments, it may be too resource intensive to analyze every frame of captured video or image information, unless the device is in a low frame rate or other such mode. In some embodiments, the device will periodically analyze captured image information to attempt to determine whether a feature in the image information appears to indicate a user making a motion or gesture. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

In some embodiments, dwell points are determined in two dimensions (x, y), relative to a plane and center point of the camera element or device, etc. If depth information is capable of being determined, such as where there are two or more image capture elements doing triangulation or stereoscopic imaging, for example, the points might instead be determined in three dimensions (x, y, z) in space. The collection of dwell points for a given motion or gesture then can be compared against sets of points stored in a library or other such data repository, where each of those sets corresponds to a particular motion or gesture. Using one or more point-matching algorithms, for example, the determined collection of points can be compared against at least a portion of the stored sets until a set of points matches with a minimum level of certainty or confidence, etc. (or until there are no more sets of points to attempt to match). In some embodiments, a curve or continuous line or function can be fit to the collection of points and compared against a set of curves, or another such matching process can be used.

In at least some embodiments, the process can further take advantage of the fact that the device can provide timing (absolute or relative) information for each point or between each pair of points. Thus, each point can have an additional dimension (x, y, t) or (x, y, z, t) that can including timing information in addition to positional information. As mentioned above, timing indication can help to determine whether the correct gesture is being determined, as a gesture with three substantially equal segments might appear to match a gesture based on the detected dwell points, but if one of those segments takes substantially longer to form then it is possible that a dwell point was missed or the gesture was not performed with enough precision to make a determination with a reasonable degree of accuracy.

The sets of points can further be encoded according to any appropriate standard or framework. In some embodiments, each tracked or monitored point or feature of a user or other object can correspond to a stream of relatively continuous points. For multiple points (i.e., when tracking all five fingers of a user's hand) there can be multiple encoded streams. Each stream can be stored as a sequence of points for matching against one or more known sequences of points. In at least some embodiments, each point has a timestamp enabling order and relative timing information to be determined. For a given feature, such as a user's hand, there might be ten features (e.g., brightest or closest points, identified feature points, etc.) that are monitored at an appropriate sample rate, such as between 100 Hz and 1 kHz, or at around 120 Hz for at least one embodiment. Such an approach might result in around one thousand points for a second-long period of time, which can provide a desired level of accuracy for identification while avoiding the processing of potentially millions of points if trying to do conventional image-based tracking. In some embodiments, an algorithm might attempt to further reduce the number of points to be tracked and/or analyzed, such as when a given feature does not move substantially between capture times, etc.

Figure 4A:
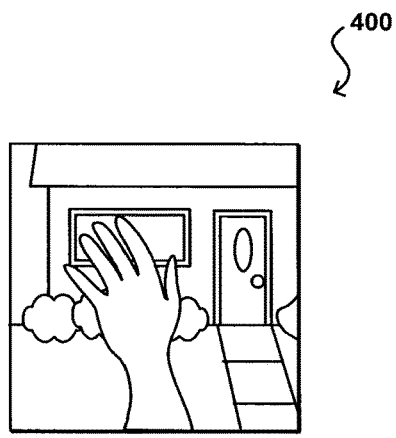
FIGS. 4(a), (b), (c), and (d) illustrate example images for analysis with different types of illumination in accordance with various embodiments.

As mentioned, various types of information can be used to attempt to locate and track specific features over time. One approach utilizes ambient-light imaging with a digital camera (still or video) to capture images that can be analyzed with an image recognition algorithm. As is known in the art, and as illustrated in the example image 400 of FIG. 4(a), however, ambient light images can include information for a number of different objects and thus can be very processor and time intensive to analyze. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

Figure 4B:
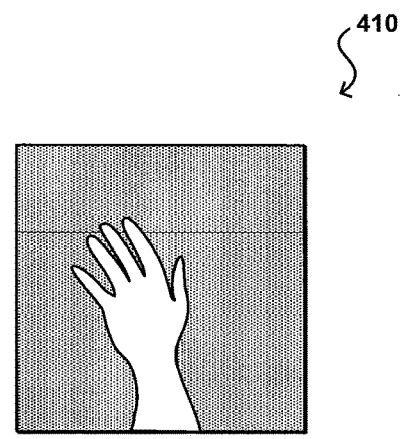

In at least some embodiments, a light emitting diode (LED) or other source of illumination can be triggered to produce illumination over a short period of time in which an image capture element is going to be capturing image information. With a sufficiently fast capture or shutter speed, for example, the LED can illuminate a feature relatively close to the device much more than other elements further away, such that a background portion of the image can be substantially dark (or otherwise, depending on the implementation). For example, FIG. 4(b) illustrates an example image 410 wherein an LED or other source of illumination is activated (e.g., flashed or strobed) during a time of image capture of at least one gesture sensor. As can be seen, since the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

Figure 4C:
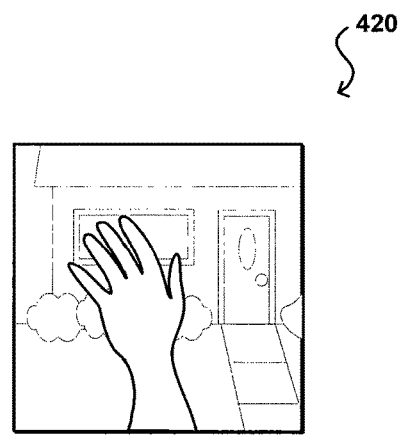

In embodiments where there is not a sufficiently fast shutter, where there is a rolling shutter effect, or in other such situations, it might be difficult to substantially prevent detecting reflections from other objects near the device. For example, FIG. 4(c) illustrates an example image 420 that could be captured using an infrared (IR) sensor, for example, wherein the hand is easier to locate in the image but the background is still present enough that an image processing algorithm might have to process other objects in the image, or might not be able to quickly locate a specific feature with a minimum level of certainty. In at least some embodiments, a device can capture both an ambient light image, such as in FIG. 4(a), and a reflected IR image, such as in FIG. 4(b). By having both images, one or more algorithms can be used to shift the images (to account for distance offset of the imaging elements) and then subtract the ambient light image 400 from the reflected IR image 420. The resulting image would be substantially dominated by the hand of the user. In at least some embodiments, a weighted subtraction can be performed when it is determined (due to contrast, lighting, or other such aspects) that the background information is likely much more intense in the ambient light image than the IR image, and vice versa. In some cases, a set of weighted comparisons can be performed until one or more features can be located with a minimum level of confidence.

Figure 4D:
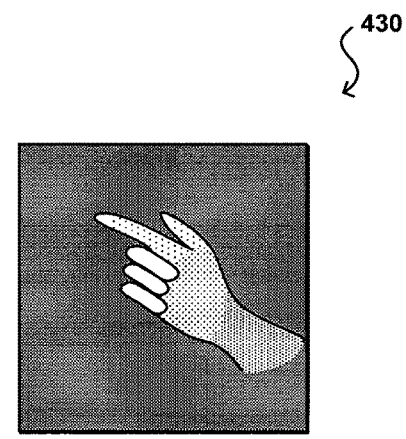

In at least some embodiments, the intensity of the reflected IR can be used to determine one or more features to be tracked between images. For example, in the example IR image 430 of FIG. 4(d) the user is using a single finger to perform a motion as input to the device. In such an example, the tip of the user's finger typically will be the closest portion of the user's hand to the device. Thus, if the relative brightness can be determined with an acceptable level of differentiation, the tip of the user's finger can be determined at least in part by looking for the brightest region in the IR image. Other features such as the tip of the user's thumb or parts of other fingers might appear relatively bright as well, which can help to determine additional points to track.

Figure 5:
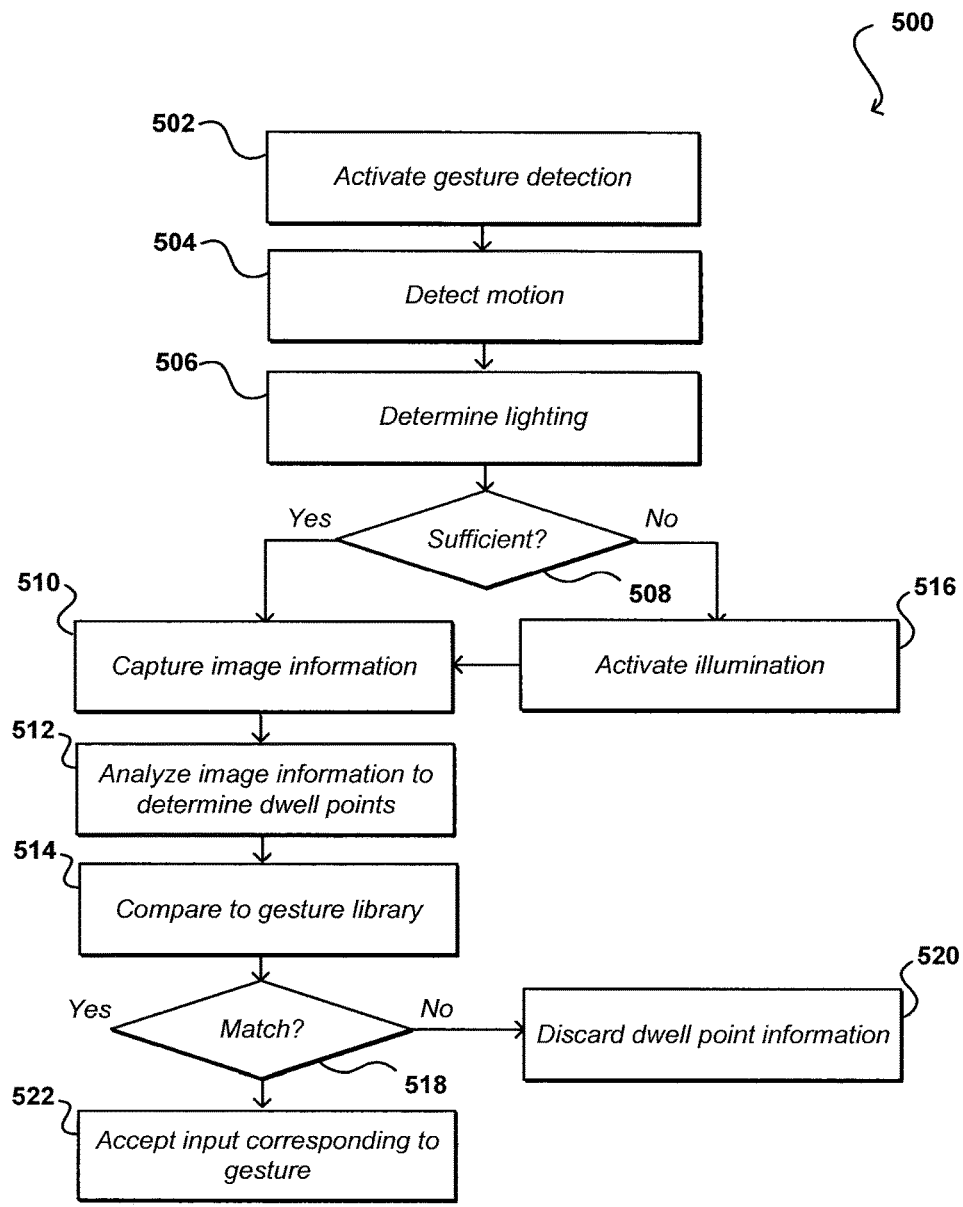
FIG. 5 illustrates an example process for determining user input that can be performed in accordance with various embodiments.

FIG. 5 illustrates an example process 500 for enabling gesture identification for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, gesture detection is activated on a computing device 502. In at least some embodiments this is activated manually by the user or upon activation of an application, for example, but can also be continually active in at least a low power state in other embodiments.

In this example, a computing device might run in a low power or low resolution mode, such as where there has not been recent gesture input. Such a mode can comprise, for example, capturing image information at a lower capture rate or analyzing captured information less frequently. In at least some embodiments, the device will change into a different mode or otherwise activate certain functionality once motion is detected 504, whether through image analysis, use of a motion detector, etc. In this example, a light detector or other such mechanism (hardware and/or software analyzing the captured image information) can determine whether there is sufficient lighting 506. If it is determined that the light is not sufficient 508, or if light is otherwise needed (such as for IR illumination), one or more illumination sources can be activated 516 before subsequent image information is captured 510. As mentioned elsewhere herein, the illumination source can be any appropriate source operable to provide an adequate amount and/or type of illumination (e.g., white light or IR), at any appropriate time (e.g., continuously during image capture or strobed with a timing of the capture).

The captured image information, which can include cached or other such temporarily stored image information as discussed above, can be analyzed to attempt to determine one or more dwell points 512. As discussed, this can include position information for one or more user features recognized in a string of images, bright regions in IR image information, points of a certain proximity or distance in the image information, etc. One or more algorithms can not only attempt to locate such dwell points, but also determine relative timing and ordering information for the dwell points. As discussed, this can include determining one or more dwell points from an image capture stream and storing values for those dwell points as a potential gesture set.

If the analyzed information is indicative of a potential gesture and a set of potential dwell points can be obtained, this set can be compared against one or more gesture patterns in a gesture library 514 or other such source. Any appropriate matching algorithm can be used as discussed or suggested herein, or as is known or used in the art for attempting to match point sets, functions, paths, or other such features. If no match can be found with at least a minimum confidence, level of certainty, or other such criterion or threshold 518, the dwell point information (and associated image information) can be discarded 520. If a match can be determined with an appropriate confidence, etc., input corresponding to that gesture can be accepted 522. Various other approaches can be used as well as discussed or suggested elsewhere herein.

Figure 6:
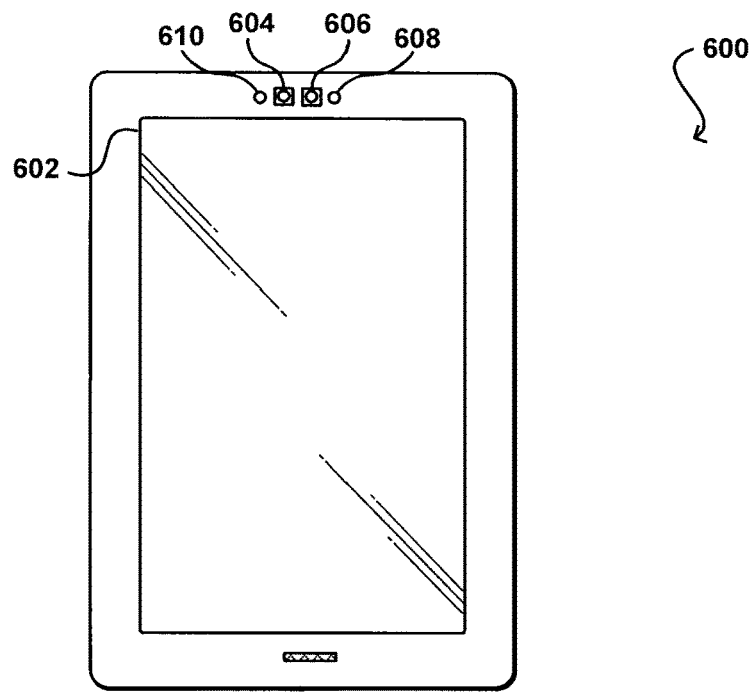
FIG. 6 illustrates an example computing device that can be used in accordance with various embodiments.

FIG. 6 illustrates an example computing device 600 that can be used to perform such a method in accordance with various embodiments. In this example, the device has a conventional digital camera 604 on a same side of the device as a display element 602, enabling the device to capture image information about a user of the device during typical operation where the user is at least partially in front of the display element. In addition, there is an infrared (IR) sensor 606 (or transceiver, etc.) positioned on the same side of the device that can be used to determine gesture input from the user when at relatively the same location. Such a configuration is useful when ambient light image information is subtracted from IR image information, but it should be understood that there can be additional or fewer cameras, sensors, or other such elements on the same or other sides or locations of the device as well within the scope of the various embodiments, such as may enable gesture or image input from any desired direction or location with respect to the device.

In this example, a light sensor 608 is included that can be used to determine an amount of light in a general direction of an image to be captured and at least one illumination element 610, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 7:
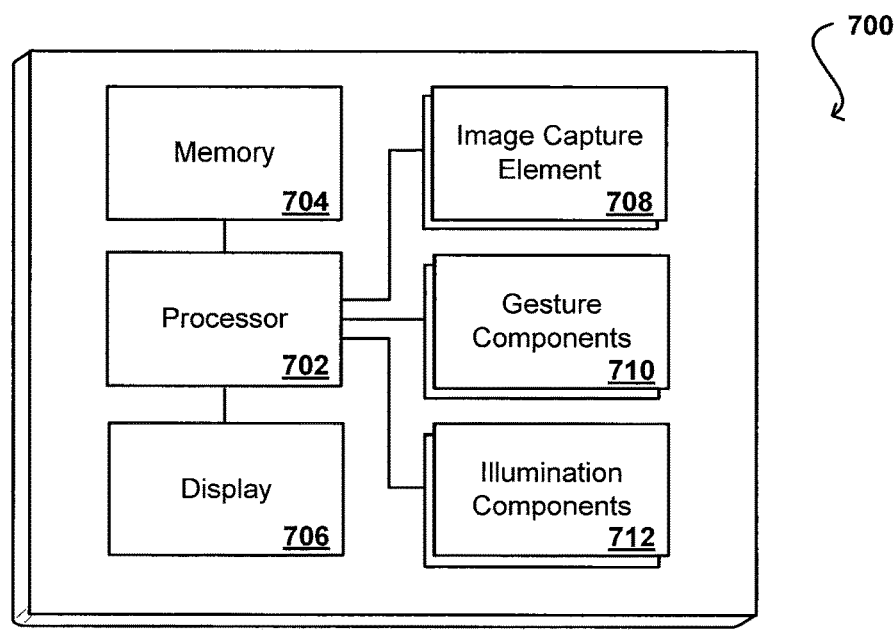
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one separate gesture component 710, such as an IR sensor or detector, operable to capture information for use in determining gestures or motions of the user, which will enable the user to provide input through the portable device without having to actually contact and/or move the portable device. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
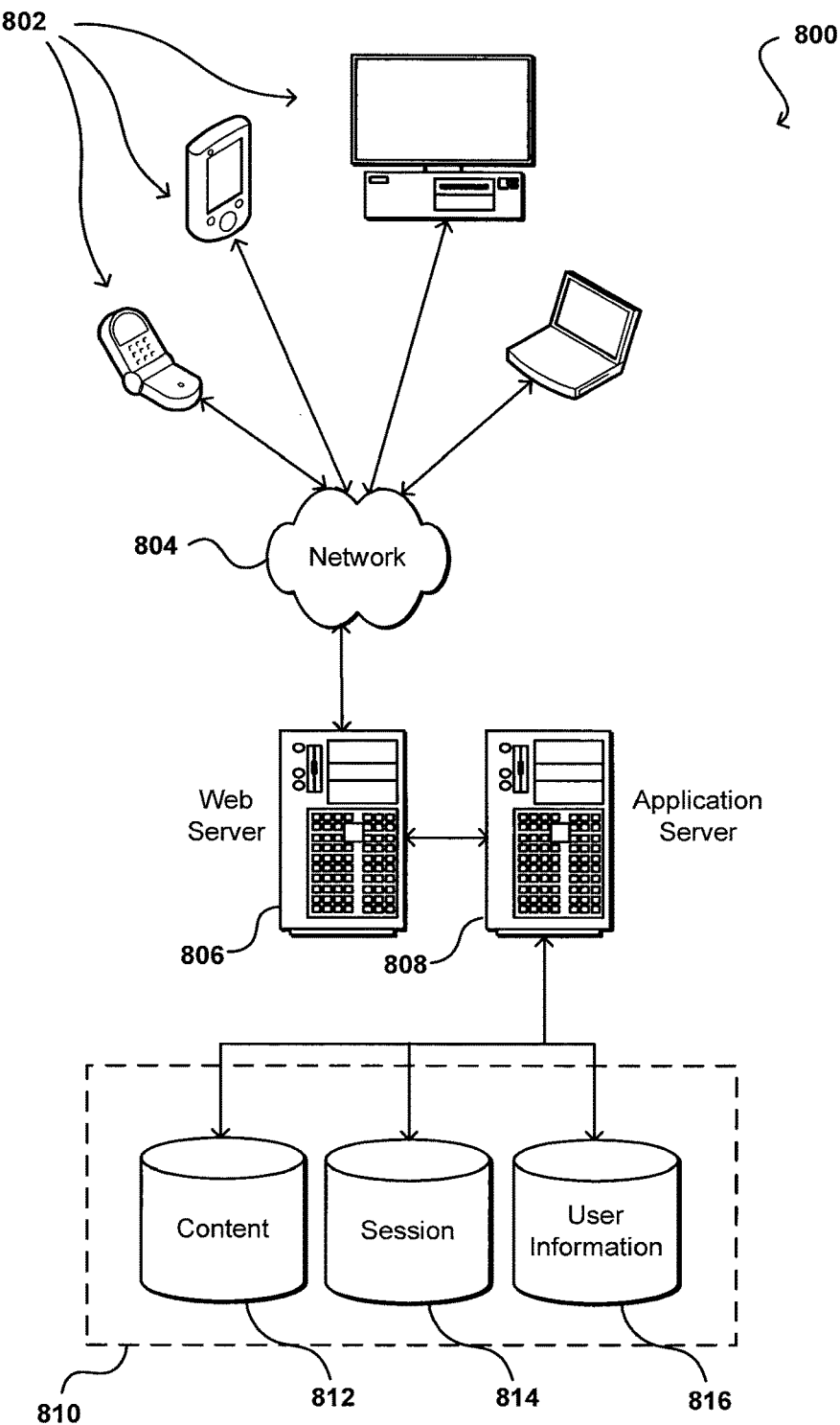
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing input to a computing device, comprising:
   detecting motion of a feature of a user within a period of time corresponding to the feature being free from physical contact with the computing device;
   capturing image information within the period of time using an image capture element of the computing device;
   analyzing a first portion of the image information to identify a first position of the feature in which the feature is substantially at the first position for at least a minimum amount of time;
   analyzing a second portion of the image information to identify a second position of the feature in which the feature moved from the first position to the second position in less than the minimum amount of time and in which the feature is substantially at the second position for at least the minimum amount of time;
   analyzing a third portion of the image information to identify a third position of the feature in which the feature moved from the second position to the third position in less than the minimum amount of time and in which the feature is substantially at the third position for at least the minimum amount of time;
   determining that the first position, the second position, and the third position match, within a minimum level of certainty, a first stored position, a second stored position, and a third stored position associated with first stored gesture information stored on the computing device; and
   performing an action on the computing device associated with the first stored gesture information.

2. The computer-implemented method of claim 1, further comprising:
   analyzing a fourth portion of the image information to identify a fourth position of the feature in which the feature moved from the third position to the fourth position in less than the minimum amount of time and in which the feature is substantially at the fourth position for a second minimum amount of time; and
   determining an end of the period of time.

3. The computer-implemented method of claim 1, further comprising:
   prompting the user to perform a gesture to be associated with the action;
   capturing second image information within a second period of time corresponding to the user performing the gesture;
   analyzing a first portion of the second image information to identify the first stored position in which the feature is substantially at the first stored position for at least the minimum amount of time;
   analyzing a second portion of the second image information to identify the second stored position in which the feature moved from the first stored position to the second stored position in less than the minimum amount of time and in which the feature is substantially at the second stored position for at least the minimum amount of time;
   analyzing a third portion of the second image information to identify the third stored position in which the feature moved from the second stored position to the first stored position in less than the minimum amount of time and in which the feature is substantially at the third stored position for at least the minimum amount of time; and
   determining that the first stored position, the second stored position, and the third stored position do not match a fourth stored position, a fifth stored position, and a sixth stored position associated with previously stored gesture information;
   storing the first stored position, the second stored position, and the third stored position as the first stored gesture information; and
   storing an association of the first stored gesture information and the action.

4. The computer-implemented method of claim 1, further comprising:
   prompting the user to perform a gesture to be associated with a second action;
   capturing second image information within a second period of time corresponding to the user performing the gesture;
   analyzing a first portion of the second image information to identify a fourth stored position in which the feature is substantially at the fourth stored position for at least the minimum amount of time;
   analyzing a second portion of the second image information to identify a fifth stored position in which the feature moved from the fourth stored position to the fifth stored position in less than the minimum amount of time and in which the feature is substantially at the fifth stored position for at least the minimum amount of time;
   analyzing a third portion of the second image information to identify a sixth stored position in which the feature moved from the fifth stored position to the sixth stored position in less than the minimum amount of time and in which the feature is substantially at the sixth stored position for at least the minimum amount of time;
   determining that the fourth stored position, the fifth stored position, and the sixth stored position match the first stored position, the second stored position, and the third stored position; and
   prompting the user to perform a different gesture to be associated with the second action.

5. The computer-implemented method of claim 1, wherein the first position corresponds to at least one of a start point, an endpoint, a transition point, or a point of reversal.

6. A computer-implemented method, comprising:
   obtaining image information captured using at least one image capture element of a computing device;
   determining, from a first portion of the image information, that at least one object is substantially at a first position for at least a minimum period of time;
   determining, from a second portion of the image information, a second position of the at least one object, in which the at least one object moved from the first position to the second position in less than the minimum period of time and in which the at least one object is substantially at the second position for at least the minimum period of time;

determining, from a third portion of the image information, a third position of the at least one object, in which the at least one object moved from the second position to the third position in less than the minimum period of time and in which the at least one object is substantially at the third position for at least the minimum period of time; and based at least in part on determining that the first position, the second position, and the third position correspond to a first stored position, a second stored position, and a third stored position associated with first stored gesture information, performing an action associated with the first stored gesture information.

7. The computer-implemented method of claim 6, further comprising:

determining that a first ordering of the first position, the second position, and the third position corresponds to a second ordering of the first stored position, the second stored position, and the third stored position, wherein the action is performed further based at least in part on the first ordering corresponding to the second ordering.

8. The computer-implemented method of claim 6, further comprising:

capturing the image information, wherein the image information includes ambient light image information and reflected infrared image information.

9. The computer-implemented method of claim 8, further comprising:

subtracting a weighted amount of the ambient light image information from the reflected infrared image information in order to substantially remove background information from the reflected infrared image information.

10. The computer-implemented method of claim 6, further comprising:

performing at least one of image recognition, proximity detection, or intensity analysis using the first portion of the image information.

11. The computer-implemented method of claim 6, further comprising:

storing the first stored position, the second stored position, the third stored position, and a fourth stored position in which the fourth stored position is substantially different relative to the first stored position, the second stored position, and the third stored position as second stored gesture information; or storing a different ordering of the first stored position, the second stored position, and the third stored position as the second stored gesture information.

12. The computer-implemented method of claim 11, further comprising:

receiving action information for a specified action to be associated with the second stored gesture information; and associating the second stored gesture information with the specified action.

13. The computer-implemented method of claim 6, further comprising:

determining the first position in two dimensions or three dimensions.

14. The computer-implemented method of claim 6, further comprising:

obtaining second image information captured using the at least one image capture element;

determining, from a first portion of the second image information that the at least one object is substantially at a fourth position for at least the minimum period of time;

determining, from a second portion of the second image information, that the at least one object moved from the fourth position to a fifth position in less than the minimum period of time and that the at least one object is substantially at the fifth position for at least the minimum period of time;

determining, from a third portion of the second image information, that the at least one object moved from the fifth position to a sixth position in less than the minimum period of time and that the at least one object is substantially at the sixth position for at least the minimum period of time; and based at least in part on determining that the fourth position, the fifth position, and the sixth position do not correspond to the first stored position, the second stored position, and the third stored position, prompting for a repeat of a gesture.

15. The computer-implemented method of claim 6, wherein the at least one object includes at least one of a hand, a finger, an eye, an elbow, an arm, or a held object.

16. The computer-implemented method of claim 6, further comprising:

activating at least one illumination element at a time of capture of the image information by the at least one image capture element.

17. The computer-implemented method of claim 6, further comprising:

deactivating a gesture input mode if no gesture is detected within a specified period of inactivity.

18. A computing device, comprising:

a processor;

at least one image capture element; and a memory device including instructions that, when executed by the processor, cause the computing device to:

obtain image information captured using the at least one image capture element;

determine, from a first portion of the image information, that at least one object is substantially at a first position for at least a minimum period of time;

determine, from a second portion of the image information, a second position of the at least one object the at least one object, in which the at least one object moved from the first position to the second position in less than the minimum period of time and in which the at least one object is substantially at the second position for at least the minimum period of time;

determining, from a third portion of the image information, a third position of the at least one object, in which the at least one object moved from the second position to the third position in less than the minimum period of time and in which the at least one object is substantially at the third position for at least the minimum period of time; and based at least in part on a determination that the first position, the second position, and the third position correspond to a first stored position, a second stored position, and a third stored position associated with first stored gesture information, perform an action associated with the first stored gesture information.

19. The computing device of claim 18, further comprising:
at least one source of illumination, wherein the instructions when executed further cause the computing device to provide, using the at least one source of illumination, at least one of white light or infrared radiation within a period of time when the image information is captured.

20. The computing device of claim 18, further comprising:
a rolling data buffer, wherein the instructions when executed further cause the computing device to:
store to the rolling data buffer the first portion of the image information; and
overwrite the first portion of the image information in the rolling data buffer with the second portion of the image information.

21. The computing device of claim 18, wherein the instructions when executed further cause the computing device to:
determine that a first ordering of the first position, the second position, and the third position corresponds to a second ordering of the first stored position, the second stored position, and the third stored position, wherein the action is performed further based at least in part on the first ordering corresponding to the second ordering.

22. A non-transitory computer-readable storage medium storing instructions that, when executed by a processor of a computing device, cause the computing device to:
obtain image information captured using at least one image capture element of the computing device;
determine, from a first portion of the image information, that at least one object is substantially at a first position for at least a minimum period of time;
determine, from a second portion of the image information, a second position of the at least one object, in which the at least one object moved from the first position to the second position in less than the minimum period of time and in which the at least one object is substantially at the second position for at least the minimum period of time;
determine, from a third portion of the image information, a third position of the at least one object, in which the at least one object moved from the second position to the third position in less than the minimum period of time and in which the at least one object is substantially at the third position for at least the minimum period of time; and
based at least in part on a determination that the first position, the second position, and the third position correspond to a first stored position, a second stored position, and a third stored position associated with first stored gesture information, perform an action associated with the first stored gesture information.

23. The non-transitory computer-readable storage medium of claim 22, wherein the instructions when executed further cause the computing device to:
determine that a first ordering of the first position, the second position, and the third position corresponds to a second ordering of the first stored position, the second stored position, and the third stored position,
wherein the action is performed further based at least in part on the first ordering corresponding to the second ordering.

24. The non-transitory computer-readable storage medium of claim 22, wherein the instructions when executed further cause the processor to:
subtract a weighted amount of ambient light image information included in the image information from reflected infrared image information included in the image information in order to substantially remove background information from the reflected infrared image information.

25. The non-transitory computer-readable storage medium of claim 22, wherein the instructions when executed further cause the computing device to: determine the first position in two dimensions or three dimensions.

* * * * *